Sept. 20, 1960    R. T. CLOUD    2,952,920
BALLAST COMPENSATED PENDULUM
Filed Jan. 22, 1957

Inventor
RAYMOND T. CLOUD

United States Patent Office 2,952,920
Patented Sept. 20, 1960

2,952,920
BALLAST COMPENSATED PENDULUM

Raymond T. Cloud, Houston, Tex., assignor to North American Geophysical Co., Houston, Tex., a corporation of Texas Filed Jan. 22, 1957, Ser. No. 635,211

1 Claim. (Cl. 33—215)

This invention relates to a pendulum structure and particularly to a sensitive pendulum for continuously furnishing a reference line with respect to the earth's gravitational field.

Where changes in inclination of orders less than 20 seconds of arc are to be measured, mounting of an inclination sensing pendulum on ordinary pivot bearings or even on ball bearing pivots gives rise to serious errors. The most satisfactory support for a disc pendulum at the present time from the standpoint of sensitivity is a wire through the axis of the pendulum, the wire being under tension to support the pendulum so that an inclination of the pendulum support results in the pendulum exerting a torque on the support through the medium of the wire.

The pendulum structure of the present invention is particularly adapted for use in mobile surveying equipment such as described in my Patent No. 2,598,355, issued May 27, 1952. In such equipment, the pendulum structure may be required to sense changes in inclination of orders less than 20 seconds of arc while being transported in a vehicle over the earth's surface. Heretofore, attempts to improve the sensitivity of an inclination sensing pendulum to small changes in inclination have produced pendulum supports more susceptible to damage resulting from inertial forces on the pendulum during travel over rough terrain.

It is therefore a principal object of the present invention to provide a pendulum adapted for mobile surveying equipment wherein the effect of pendulum inertia on the support for the pendulum during operation of the equipment will be minimized.

Another object of the invention is to provide a pendulum structure having means for absorbing shocks resulting from the inertia of the pendulum which would otherwise be transmitted to the pendulum support.

A further object of the present invention is to provide a pendulum structure having means for relieving the pendulum supports of the weight of the pendulum.

It is still another important object of the present invention to provide a pendulum of greatly increased sensitivity for use in mobile surveying equipment.

Figure 1:
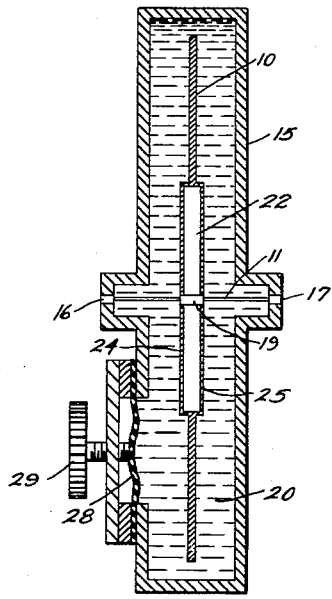
Figure 2:
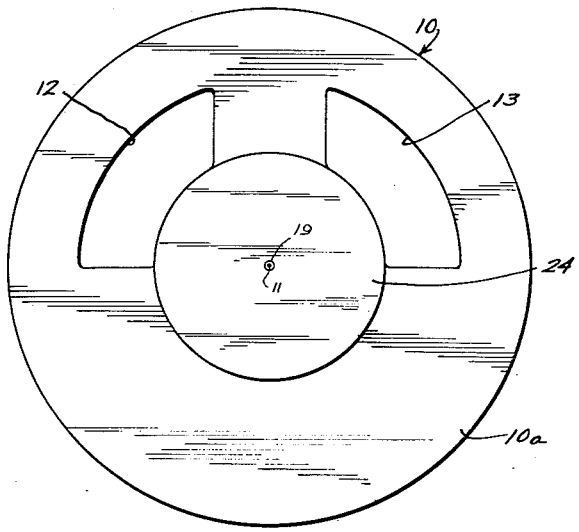

Other objects, features and advantages of the present invention will be more fully apparent from the following detailed description, taken in connection with the accompanying drawings, in which:

Figure 1 is a somewhat diagrammatic vertical cross-sectional view illustrating a pendulum structure constructed in accordance with the present invention; and Figure 2 is a somewhat diagrammatic side elevational view of the pendulum shown in Figure 1.

As shown on the drawings:

The present invention is particularly applicable to a disc type pendulum such as indicated by the reference numeral 10 in Figures 1 and 2 mounted by means of a wire 11 for oscillation on a central axis. The disc 10 may be of uniform thickness and symmetrical with respect to its central axis except for cutout portions 12 and 13 which cause the lower part of the disc indicated at 10a to be heavier than the upper part. The support wire 11 is fixedly secured at its opposite ends to a housing 15 by suitable means indicated at 16 and 17 while the intermediate portion of the wire 11 is fixedly secured relative to the disc 10 by suitable means indicated at 19. By this means, any slight inclination of the housing 15 with respect to the earth's gravitational field will cause the central portion of the support wire 11 to be twisted relative to the opposite ends thereof since the disc 10 will tend to maintain its alignment with the earth's gravitational field.

Any suitable detecting means may be provided for determining when the pendulum housing deviates from a vertical line, such means being illustrated, for example, in my copending application Serial No. 627,602 filed December 11, 1956, now Patent No. 2,827,604, and entitled "Null Detecting System for Pendulums and Similar Devices." The disclosure of said copending application is incorporated herein by reference. Any deviation between the supporting structure and the center line of the pendulum actuates a servomotor so as to rotate the housing 15 and thus to remove the torque from the support wire 11. A suitable servo system is illustrated in my aforementioned Patent No. 2,598,355.

In order to accommodate a very small diameter support wire and thereby to provide greatly increased sensitivity, the disc 10 is immersed in a damping fluid such as indicated at 20. Preferably, the disc 10 carries a central ballast chamber as indicated at 22 which is so designed that the entire pendulum displaces an amount of liquid approximating the weight of the pendulum. Further, the design is such that the buoyant effects are equally distributed around the axis of the pendulum support while the mass affected by gravity is still unequally distributed so as to form the pendulum. As a result of this construction, the pendulum support wire 11 need not support the weight of the pendulum, and further the support wire 11 is insulated from any inertia effects resulting from movement of the pendulum structure over rough terrain or the like. Under the impact of shock the fluid moves with the pendulum and absorbs the shock, so that substantially no shock is imparted to the support wire. The liquid surrounding the pendulum acts as a damping medium, thus eliminating the electro-magnetic damping formerly used.

The side walls 24 and 25 defining the air space 22 are relatively thin so that application of pressure on the liquid 20 will provide an extremely sensitive adjustment for weight compensation for the pendulum, although this will not usually be required. For obtaining a precise balance between the weight of the pendulum assembly and the amount of liquid displaced by the pendulum, the balance chamber 22 may be designed to normally provide a slight excess of displacement relative to the weight of the pendulum. The housing 15 is provided with a small diaphragm 28 with an adjustment screw 29 which is operative to press against the diaphragm 28 and increase the liquid pressure in the housing; this slightly increased pressure acts on the side walls 24 and 25 of the ballast chamber to slightly reduce the volume displaced by the chamber thereby providing a fine adjustment for the weight that is borne by the suspension wire or bearings.

An example of a pendulum which embodies the principles of the present invention would be a four inch diameter disc with a two inch diameter ballast cylinder at the center, as illustrated in Figure 2. If the disc 10 is made of .020 inch thick aluminum, the ballast chamber 22 may have a thickness of .120 inch when the pendulum assembly is immersed in silicone fluid of a specific gravity of .972.

It will be understood that the housing 15 will also contain a suitable pickup device for actuating the servo follow-up mechanism, such as the device illustrated in my aforementioned copending application Serial No. 627,602. The housing 15 will also serve as a mount for the torque motor for compensating horizontal acceleration effects as described in my Patent No. 2,665,499, issued January 12, 1954.

It will be appreciated that it is a highly important feature of the present invention that the ballast chamber 22 is symmetrical with respect to the axis of the pendulum so that there will be no turning moment exerted on the pendulum as a result of buoyancy. The slight excess displacement of pendulum material below the axis of the pendulum relative to the reduced amount of material above the pendulum axis can be generally tolerated in practice. If extreme accuracy of balance about this axis were desired, the ballast chamber could be set a little high to compensate for the excess displacement of pendulum material below the axis of the pendulum.

It will apparent that many modifications and variations may be effected without departing from the scope of the novel concepts of the present invention.

I claim as my invention:

A pendulum structure comprising a disc having a non-uniform mass distribution with respect to a predetermined axis, a liquid tight housing enclosing said disc and having a liquid medium therein in which said disc is immersed, a torsion wire supporting said disc in said housing for oscillation on said axis, said disc having means defining a chamber substantially symmetrically disposed with respect to said axis and having a gaseous medium therein, said disc together with said chamber defining means being of volume to have a buoyancy with respect to said liquid medium at least approximating the weight of said disc, said means defining said chamber comprising a relatively thin wall which is displaceable inwardly upon increase in pressure of said liquid medium, and said housing having means for exerting pressure on said liquid medium for adjusting the volume of said chamber of said disc.

References Cited in the file of this patent

UNITED STATES PATENTS

| 1,220,407 | Fogelsong | Mar. 27, 1917 |
| 1,634,934 | Donaldson | July 5, 1927 |
| 2,407,580 | Scott | Sept. 10, 1946 |

FOREIGN PATENTS

| 20,056 | Great Britain | Sept. 10, 1896 |
| 239,376 | Great Britain | Sept. 10, 1925 |